Nov. 15, 1927.
J. P. CARMICHAEL
ROOT CANAL FILLING FOR TEETH
Filed Sept. 10, 1925
Fig. 1.
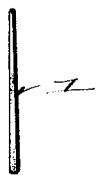
Fig. 2.     Fig. 4.
Fig. 3.
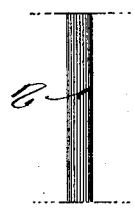  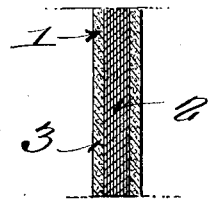
Fig. 5.
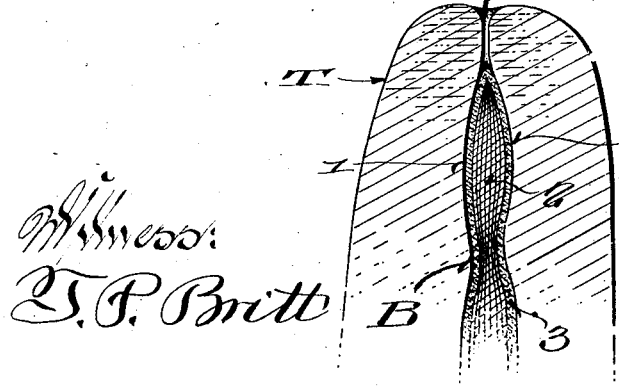

Patented Nov. 15, 1927.

1,649,508

UNITED STATES PATENT OFFICE.

JOHN P. CARMICHAEL, OF MILWAUKEE, WISCONSIN.

ROOT-CANAL FILLING FOR TEETH.

Application filed September 10, 1925. Serial No. 55,548.

This invention pertains to improvements in root canal fillings for teeth, and has primarily for its object to provide a permanent filling of sufficient stiffness to be projected through the customary tortuous and irregular root channels present in teeth, and at the same time one which is capable of being packed or forced into the minute recesses and uneven surfaces of the root canal and provide a filling to seal the apical openings and other foramina, either in the presence of moisture or in the dry state.

Another important object is to provide a canal filling embodying the above characteristics, and which has certain antiseptic properties that serve to bring about and maintain a sterile condition within the channel and foramina of the root.

With the above and other objects in view, which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

Figure 1 is an elevational view of root canal filling constructed in accordance with the present invention;

Figure 2 is a greatly enlarged elevational view of a fragment of a fibrous material utilized in the invention;

Figure 3 is a similar view, showing the outer fibres abraded or loosened the same being exaggerated for the purpose of more clearly illustrating the invention;

Figure 4 is an enlarged longitudinal sectional view through a fragment of a complete filling;

Figure 5 is an enlarged section through a portion of a tooth root and canal filling, for the purpose of illustrating the manner of application of the present invention.

It has heretofore been a difficult problem to find a material suitable for the proper filling of a tooth root canal, it being common practice at the present time to utilize fillings or canal points constructed of guttapercha, which are projected into the tortuous root channel after being dipped or coated with chlora-percha, a composition of cement or similar preparation in a running adhesive state. This cement or composition is dependent upon the existence of a dry condition within the canal, in order that it may properly harden and seal the apical opening or foramina communicating with the root filling.

The disadvantages of the foregoing method are obvious in view of the fact that a canal point constructed of guttapercha or similar material, which by itself is not capable of being properly compressed by the ordinary packing instrument, will not pack into the irregularities found in root canals, and further should a stricture occur in the root channel it is obvious that the point must be small enough to be projected through the stricture and consequently it will be of less diameter than the enlarged portions of the canal, and therefore will fail to properly fill the same. Further, as a point of this character, coated with cement or other composition is forced past the constriction, its outer surface will necessarily be scraped by the stricture, thus preventing any of the cement from being carried up into the tooth channel to properly perform its function. An additional objection to the present method resides in the fact that cement in the running adhesive condition in which it must be used, will carry air before it leaving a hollow space.

Referring now more particularly to the accompanied drawing the present invention which is designed to overcome the foregoing objections consists of a canal point or filling 1, which in its preferred form comprises a central core 2, preferably formed of mineral fibre such as asbestos in its crude or natural state. The core 2 is obtained by separating from the block of asbestos a strand of the desired size, which is composed of a plurality of minute fibres closely associated to the extent of giving the core the desired amount of stiffness. In its crude form the surface fibres of the core are very smooth consequently I propose to abrade or loosen these as illustrated in Figure 3, whereby they serve to hold a coating 3 preferably of a material such as mineral wax, which is applied in soluble form and then allowed to harden.

For coating I propose to use a mineral wax base of a character, which is soluble in chloroform or other suitable solvent. To this solution is added iodoform or some other derivative of iodine, such as aristol or mentholated iodine which is possessed of medicinal properties essential for creating and maintaining the sterile condition desired. After the core 2 has been dipped or coated in a solution of the foregoing character the same is allowed to harden and it will be readily seen that the abraded fibres of the surface of the core 2 will become imbedded with the coating and serve to securely retain or bind the coating 3 to the core. It will also be appreciated, in view of the natural properties and consistence of the coating utilized in connection with the multiple fibrous reinforcement that a filling so constructed embodies sufficient stiffness to permit its easy projection into a root canal in the operation of making a filling.

In Figure 5, wherein the application of the present invention is illustrated, T represents a portion of the tooth root provided with the customary channel C which communicates with the apical opening A and in which the constriction B occurs. The minute foramina communicating with the canal C are not shown inasmuch as this structure is well known to those skilled in the profession.

In the application of the present invention, the method I prefer to follow, is to first fill the root canal with a paste of a suitable nature and consistency, which may be medicated if desired, and thereafter inserting the point which serves as a packing medium to force the paste into the openings and foramina to seal the same.

Particular attention is directed to the fact that the core 2, because of its fibrous construction, can be readily packed or forced into the uneven and enlarged portions of the channel, as illustrated in Figure 5, by means of a packing instrument.

Due to the fact that both the fibre and coating are of mineral composition, it is obvious that the same will not undergo decomposition, neither will it shrink nor expand. Consequently a permanent suitable filling has been provided that is not only non-injurious to living tissues, but which will continually serve to maintain an antiseptic condition. Also the presence of a moisture within the canal can have no effect on the filling or prevent it from properly sealing the opening communicating with the surface of the channel.

While I have illustrated and described one form of my invention as embodying a core of multiple fibrous structure coated with a non-decomposing substance of waxy consistency, it is also to be understood that broadly the invention resides in the incorporation of these two or similar elements in any form or manner whatsoever, as for instance, the fibrous material be finely separated and intimately commingled with the waxy or plastic material,—the essential purpose of the fibre being to stiffen the point and provide resistance to the packing instrument employed in forcing the filling into the root canal, whereby the filling may be forced ahead of the instrument instead of being merely penetrated or pierced by it.

Thus I may employ fibre of any kind, either in its crude state, or finely separated or ground, and incorporate this intimately with a plastic or waxy substance, such as mineral wax, or the like, to form a stiffening and binding element for the plastic substance and also increase its resistance against the necessarily fine point of the packing instrument.

I claim:

1. A tooth root canal filler, comprising a mineral wax composition, reinforced by mineral fibre.

2. A tooth root canal filler, comprising multiple fibrous strands incorporated with mineral wax.

3. A tooth root canal filler, comprising a central stiffening core surrounded by a coating of mineral wax.

4. A tooth root canal filler, comprising a central stiffening core of mineral fibre surrounded by a coating of mineral wax.

5. A tooth root canal filler, comprising a central stiffening core composed of mineral fibre in its crude or natural state, and surrounded by a coating of plastic material.

6. A tooth root canal filler, comprising a stiffening core composed of asbestos fibre, in its crude or natural condition, and surrounded by a coating of plastic material.

7. A tooth root canal filler, comprising a stiffening core composed of asbestos fibre in its crude or natural state and surrounded by a coating of mineral wax.

8. A tooth root canal filler, comprising a stiffening core of mineral fibre in its crude or natural state, surrounded by a coating of plastic material, the surface fibres of said core being abraded and imbedded in said coating.

9. A tooth root canal filler, comprising a stiffening core of asbestos fibre in its crude or natural state, the surface of said core being abraded and imbedded in a coating of mineral wax.

In testimony that I claim the foregoing I have hereunto set my hand at Milwaukee, in the county of Milwaukee and State of Wisconsin.

JOHN P. CARMICHAEL.